Figure 1:
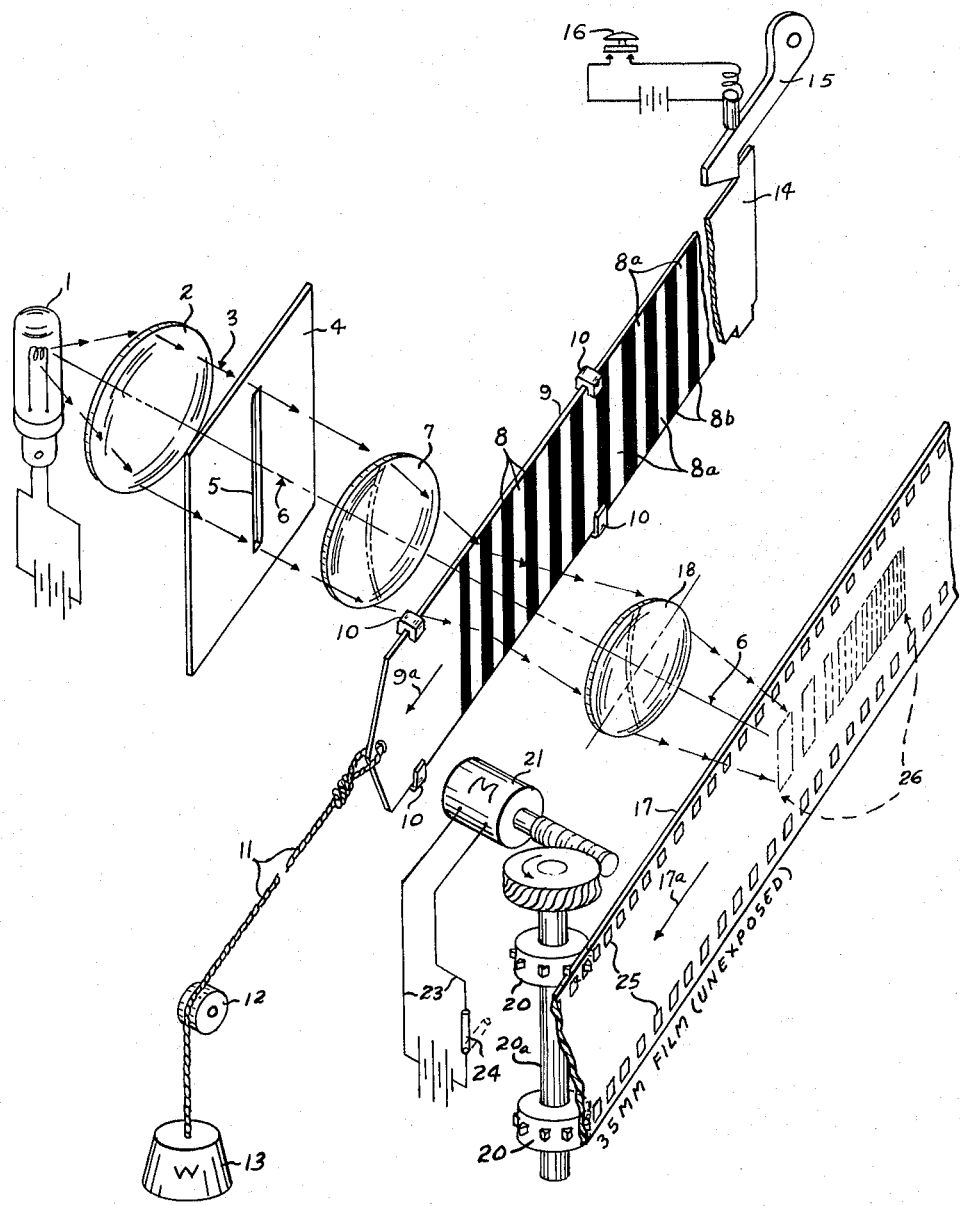

March 29, 1966 J. A. SHAY ETAL 3,242,801
PHOTOGRAPHIC FM FUNCTION GENERATOR
Filed Sept. 12, 1963 2 Sheets-Sheet 1

INVENTORS
JOHN A. SHAY
KURT E. UTLEY
BERTRAM J. GOLDSTONE
BY
ATTORNEYS

March 29, 1966 J. A. SHAY ETAL 3,242,801
PHOTOGRAPHIC FM FUNCTION GENERATOR
Filed Sept. 12, 1963 2 Sheets-Sheet 2

INVENTORS
JOHN A. SHAY
KURT E. UTLEY
BY BERTRAM J. GOLDSTONE

ATTORNEYS 3,242,801
PHOTOGRAPHIC FM FUNCTION GENERATOR
John A. Shay, Chelmsford, Kurt E. Utley, Bedford, and
Bertram J. Goldstone, Sudbury, Mass., assignors to
the United States of America as represented by the
Secretary of the Air Force
Filed Sept. 12, 1963, Ser. No. 308,601
8 Claims. (Cl. 88—24)

The invention relates to function generating apparatus for generating an output quantity having a predetermined functional relationship to a variable input quantity and, more particularly, to means and methods for producing line gratings for sinusoidal transmission incident to movement of the grating across a projected light beam at a predetermined constant velocity, and has for an object the means and method for making the grating on a sensitized photographic film strip on which parallel transverse transparent lines are formed having a progressively, uniformly, decreased spacing therebetween, when developed, to provide a linear frequency, frequency modulation (FM) function generator grating.

A further object of the invention is the provision of means for generating a FM function linear frequency line grating by projecting a light modulated beam on a sensitized photographic, uniformly moving, film strip in which the modulating element consists of a continuous wave (CW) sine-wave grating which has a sinusoidal transmission from film fog level to maximum opacity, in which a collimated light beam consisting of a small spot or line is imaged in the plane of the grating, and the linear frequency function grating is made on the sensitized photographic film strip by moving the CW sine-wave grating at a constant linear accelerated rate across the axis of the light beam while moving the sensitized film strip in parallel relation transversely across the light beam axis at a predetermined uniform rate to produce a linear FM frequency line grating on the sensitized film strip when developed.

A further object is the provision of means whereby the CW sine-wave grating is moved at a uniform rate of acceleration past the axis of a slit-shielded collimated light beam to successively expose a row of spots or transverse lines on a sensitized film strip moving in parallel relation across the axis of the light beam at a constant uniform rate of travel to provide an opaque film strip having a row of transverse transparent lines or spots therethrough uniformly decreasing in width and linearly in spacing therebetween to provide a film strip, when developed, comprising a linear frequency modulating line grating.

A further object is the provision of means for moving the CW sine-wave grating across the axis of the light beam under the influence of gravity to obtain a uniform rate of acceleration thereof while the sensitized film strip moves at the predetermined uniform linear rate of travel, parallel to the CW sine-wave grating.

A further object of the invention is mounting the CW sine-wave grating across the slit-shielded collimated light beam for free vertical fall when released to provide a constant rate of linear acceleration of the grating across the light beam, including lens means for focusing the CW sine-wave grating openings on the sensitized film strip during the uniform rate of movement of the sensitized film strip through the axis of the light beam, and developing the exposed sensitized strip to produce a linear frequency modulating grating.

Other objects and advantages of the invention will become apparent from the following description and accompanying drawings in which like reference characters refer to like parts in the several figures.

FIGURE 1 is a somewhat schematic perspective view diagrammatically illustrating one form of the invention and method for producing a FM function generator linear frequency line grating.

Figures 2, 3:
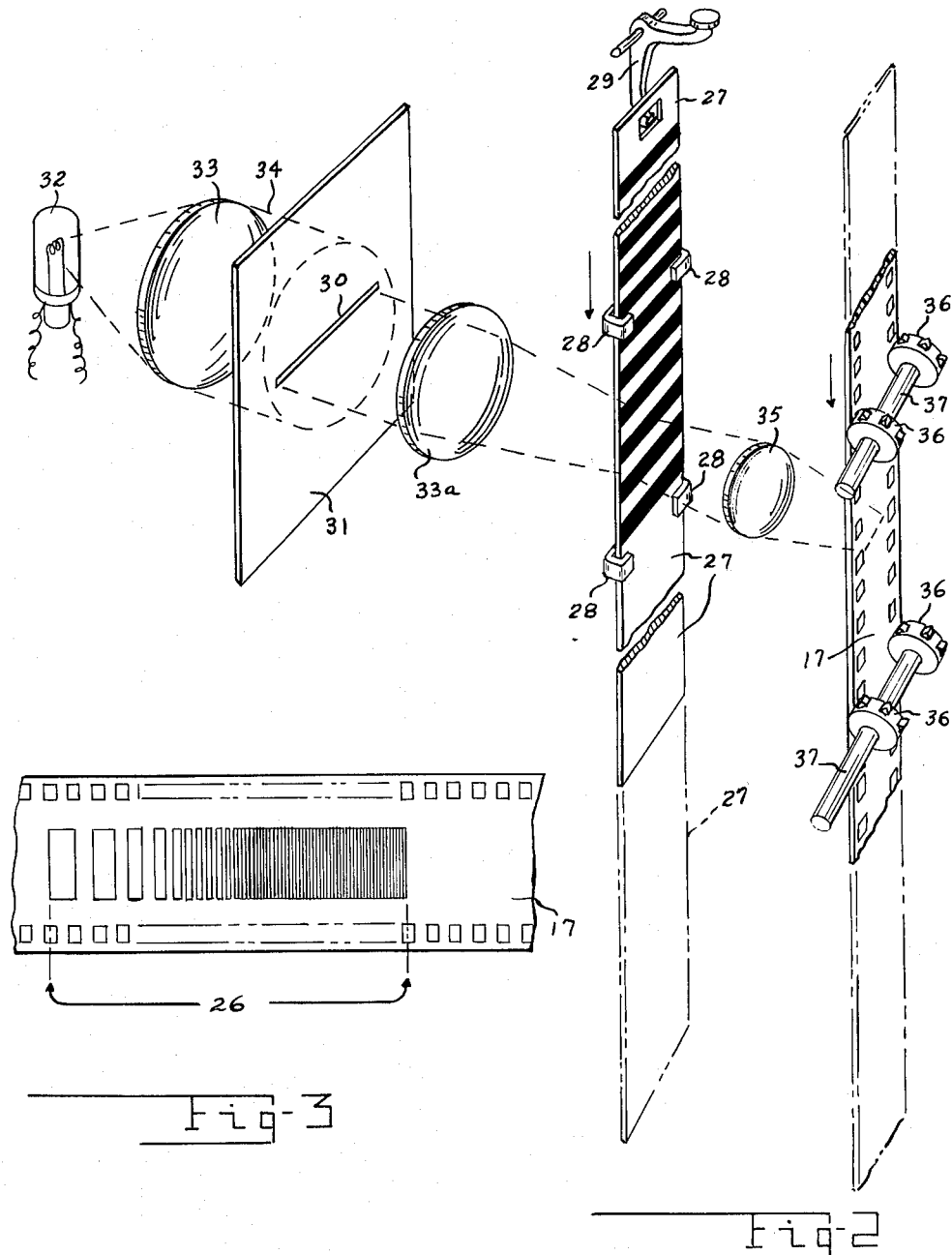

FIGURE 2 is a somewhat similar schematic perspective view illustrating a different arrangement of apparatus for producing a linear frequency line grating on an elongated sensitized film strip in which the CW sine-wave grating is releasably mounted for free vertical fall under the influence of gravity to produce constant acceleration thereof through the axis of the light beam while the sensitized film strip moves uniformly.

FIGURE 3 is a fragmentary plan view of a portion of the conventional film strip employed, after exposure and development, diagrammatically illustrating the linear frequency grating formed photographically thereon according to the invention.

Referring to FIGURE 1 of the drawings, the reference numeral 1 denotes a concentrated light source while the reference 2 indicates a light collimating lens member in front of the light source 1, forming a collimated light beam 3 which is partially blocked or interrupted by an opaque panel or shield 4 having a very narrow vertical slit 5 therein perpendicularly to and through axis 6 of the light beam 3.

Instead of the slit 5 the shield 4 could be pierced by a very small aperture, preferably coincident with the light beam axis 6. However, this apertured plate just mentioned is not shown since the detail construction of the plate 4 by itself is not important, but is only to provide a line opening or a spot opening for passage of a portion of the collimated beam 3 therethrough.

A second lens member 7 is fixed in front of the plate 4 for focusing or imaging the slit (or spot) opening in the plane of a conventional light beam modulating grating 8 on a film strip 9, the grating being a CW sine-wave grating with Ronchi ruling, consisting of transverse, equal width, equally spaced parallel opaque and transparent portions 8a and 8b, respectively, and is mounted in suitable guide means 10 for free longitudinal movement across the axis 6 of the light beam 3 in a plane perpendicular to said axis 6 under the influence of gravity. As shown, one of the strip 9 carrying the grating 8 is connected to a light, flexible cable 11, passes over a pulley 12 with the other end of the cable 11 connected to a mass or weight 13 for advancing the grating 8 longitudinally under the influence of gravity effective on the weight 13.

If desired, the opposite end of the CW sine-wave grating strip 9 may be provided with a shoulder or abutment 14 for engagement with a release latch member 15 which may be lifted magnetically by depression of the switch button 16.

As shown, the image plane of the grating 9 is focused on a sensitized photographic film strip 17 disposed in a plane parallel to the plane of the grating strip 9 by suitable lens means 18. The film strip 17 is arranged to be advanced uniformly at a predetermined constant rate of movement parallel to the grating strip 9 by any suitable film moving means, such as drive sprockets 20 fixed on a shaft 20a which is driven by a constant speed motor 21 through suitable reduction gearing, such as indicated at 22 when the motor energizing circuit 23 is closed by a suitable switch means 24.

The film 17 may be a conventional sensitized 35 mm. film, having sprocket holes 25 for positive driving engagement by the sprockets 20.

Modulation occurs when the grating 9 moves past the spot or vertical line or narrow beam of collimated light projected through the slit 5 at a constant acceleration by gravity, due to release and free fall of the weight 13 while the photographic film strip is advanced by the motor or drive means 21 at a constant rate of travel. In order to maintain resolution, it is necessary that the illuminated spot or transverse line is sufficiently smaller in width than the line width in the grating 8.

After the CW sine-wave grating strip having the CW Ronchi ruling is released and advanced at constant acceleration while the film strip 17 is advanced at a constant predetermined rate in the direction indicated by the arrows 9a and 17a, and developed, the linear frequency line grating is obtained similar to that indicated at 26, graduating uniformly in transparency from infinite width and spacing to maximum opacity, as seen in FIGURE 3. However, in this figure of the drawing, it must be considered that the film has maximum opacity while the blocks or rectangles or lines graduating from left to right, and shown blacked in, are transparent, finally fading into complete opacity.

Referring to the form of the invention shown in FIGURE 2, the primary difference is that the Ronchi ruling or CW sine-wave grating and the parallel sensitized photographic film strip are mounted for movement in a vertical direction in this figure of the drawings, the CW sine-wave grating being indicated at 27 is mounted in the guide means 28 for free fall by its own weght and retained until released by a latch or other release means 29. If desired, a weight (not shown) could be secured to the lower end of the Ronchi ruled grating or panel 27. This arrangement, of course, requires the narrow light slit opening 30 in the opaque panel 31 to be horizontal instead of vertical, in the event that a very narrow beam of collimated light is desired instead of a very small circular spot beam, as should be readily understood.

Light from the concentrated light source 32 is collimated by the lens means 33 to form the collimated beam 34, only a narrow portion thereof passing through the light slit 30 is imaged on the CW Ronchi ruled grating panel of strip 27 by the lens 33a, which beam is progressively interrupted by the ruling on the strip 27 in a uniformly accelerated rate as the strip 27, upon release, drops by gravity. The lens 35 focuses the image of the ruled grating on the sensitized photographic film strip as it is advanced downwardly at some desired uniform rate of travel by the sprockets 36 fixed on the shaft 37 which is rotated at some desired uniform rate by a suitable motor through speed reduction means (not shown). The FM linear frequency function generator grating obtained is the same as described in connection with FIGURE 1 and as diagrammatically shown in FIGURE 3.

In order to achieve linear modulation it is, of course, necessary to image the blinking light on the photographic film traveling at a constant velocity.

The following is one formula for producing a linear frequency line grating.

Let:

$F_s$ be the spatial frequency generated at the grating
$F_f$ be the line frequency recorded on the film
$F_g$ be the line spacing of the grating
$V_f$ be the velocity of the recording film
$V_g$ be the instantaneous velocity of the CW grating
$A_g$ be the acceleration of the grating $$F_s = F_g V_g = \text{line/in.} \times \text{in./sec.} = \text{line/sec.} \quad (1)$$

and $$F_f = \frac{fs}{Vf} = \text{line/sec.} \times \text{sec./in.} = \text{line/in.} \quad (2)$$

but $$V_g = A_g0 t$$

so:

$$Ff = \frac{F_g A_g t}{Vf} \quad (3)$$

which is a linear function of time assuming the grating is dropped:

$$A_g = 32.2 \text{ ft./sec.}^2 = 386.4 \text{ in./sec.}^2$$

The required bandwidth for the linear FM line grating is from 8.84192 to 9726113 lines/in.

$$\Delta F = 88.41921 \text{ lines/in.}$$

This information must be contained in 1.130976 inches of film which is scanned in 10 $\mu$sec.

To compute $V_f$ for the above bandwidth:

$$Vf = \frac{X}{t} \text{ or } t = \frac{X}{Vf}$$

$$F = \frac{fg \times Ag \times X}{V_f^2} \quad (4)$$

Letting:

$F_g = 85$ lines/inch
$A_g = 386.4$ ft./sec.$^2$
$X = 1.130976$ in.

$$V_f^2 = \frac{85 \times 386.4 \times 1.130976}{88.41921}$$

$$V_f^2 = 420.10.$$
$$V_f = 20.49$$

Time required to expose 1.130976 inches of film:

$$97.26113 \times V_f = 85 \times 386.4 t$$

$$t = \frac{97.26113 \times 20.49}{85 \times 386.4} = \frac{199288055}{32844}$$

$$t = 60.677 \ \mu\text{sec.}$$

Distance grating drops in $t$ seconds:

$$S = \tfrac{1}{2} A_t^2 + v_0^t \text{ where } v_0 = 0$$

$$S = \frac{386.4 (63.979)^2}{2} \qquad S = .713 \text{ in.}$$

Assuming a maximum drop distance of 1.5 in., the fall time becomes 88.113 $\mu$sec. which corresponds to a maximum i.e. frequency of 140 lines/in.

The final recorded film would consist of a linear FM function from 0 to 140 lines/in. which is 1.9 inches long. Since the film velocity remains constant, the section of interest i.e. 8.8 to 97 lines/in., can be taken from the recorded sample diagrammatically shown in FIGURE 3.

In conclusion, the parameters are:

Grating frequency _____ lines/in__   85
Film speed _____ in./sec__  20.49
Drop distance _____ in__        1.5
Fall time _____ $\mu$sec__ 88.113

The frequency range of any function may be chosen by selecting the proper Ronchi ruling frequency and film velocity.

We claim:
1. An apparatus for photographically producing a predetermined FM function generator grating strip comprising, a concentrated light source, means in front of said light source for forming a collimated light beam having its central axis extending in a horizontal direction, an opaque shield fixed in the path of said light beam having a narrow light slit opening therein of predetermined width extending through said axis to the opposite sides thereof to form a collimated narrow flat light beam, a transparent uniform sine-wave grating strip freely movable through the axis of said light beam perpendicular thereto and perpendicular to said light slit under the influence of gravity and in one direction only, when released to produce uniform acceleration of said grating through said light beam means for releasably supporting said strip against said movement, means spaced forwardly of said grating for supporting and moving a sensitized film strip across the axis of said light beam in spaced parallel relation to said grating simultaneously with the movement of said grating in the same direction of grating movement at a predetermined uniform rate of travel for exposing said film strip through said grating during release and gravitational acceleration thereof, whereby a FM function generator strip is produced when said film strip is processed.

2. Apparatus as set forth in claim 1 in which said light slit extends horizontally through said light beam axis and said sine-wave grating is mounted for free vertical fall by gravity when released, including latch means for releasably supporting said strip, and power operated means is provided for moving the sensitized film strip vertically in parallel relation to said sine-wave grating at a uniform rate of movement during the free fall by gravity movement of said grating.

3. Apparatus as set forth in claim 2 including lens means for concentrating the narrow collimated light beam on the sine-wave grating during supporting, release, and the movement of the grating under the influence of gravity, and second lens means between the grating and the plane of movement of the sensitized film strip for focusing the image of the grating on the sensitized film strip during the uniform rate of movement thereof by the power operated means.

4. Apparatus as set forth in claim 3 including releasable means for supporting said grating in said vertical position aforesaid, means for releasing said releasable means to permit said grating to freely accelerate downwardly by gravity upon release thereof by said releasable means.

5. Apparatus for optically producing line gratings for sinusoidal transmission incident to uniform movement of the grating across a projected light beam at a constant velocity comprising, a light source, lens means in front of said light source for projecting a collimated light beam from said light source, an opaque shield in front of said lens means having an elongated light slit opening therein for passing a narrow elongated collimated portion of said light beam therethrough having a central axis, an elongated flat sine-wave grating means releasably fixed in front of said shield in spaced relation thereto for free longitudinal movement under the influence of gravity through said elongated narrow light beam in a plane perpendicular to the longitudinal axis of said light slit opening to produce uniform continuous acceleration of said sine-wave grating means through said light beam when released, lens means fixed between said shield and said elongated sine-wave grating means for focusing the image of said light slot on the surface of said sine-wave grating means, means in front of said sine-wave grating means for receiving and moving a sensitized photographic film strip through the axis of said light beam in parallel spaced relation to said sine-wave grating in a direction parallel to the direction of movement of said elongated sine-wave grating when released at a predetermined uniform rate of movement, to expose said uniformly moving film strip through said sine-wave grating during simultaneous accelerated rate of movement of said grating and uniform film strip movements thereof, and lens means between said grating and the plane of movement of the sensitized film strip for focusing the grid of said grating in the plane of the film strip aforesaid, whereby when the film strip is processed photographically a FM function generator grid is produced.

6. A method for producing an FM function generator film strip grating photographically which comprises, projecting a collimated light beam through an elongated narrow restricted slit in an opaque shield, moving a transparent uniform sine-wave grating strip through said narrow elongated light beam in one direction only perpendicular to the elongated dimension of the slit and to the direction of propagation of the light beam under the influence of gravity to obtain a uniform free gravitational acceleration of said sine-wave grating through the light beam in one direction only, and simultaneously moving a sensitized photographic film strip across the axis of the light beam in the same direction as the direction of movement of the grating at a uniform constant rate, parallel to the gravitational accelerating movement of the grating, to receive and record the light in the beam passing through said sine-wave grating and said slit, and processing said film strip to produce a FM function generator film strip photographically, when said film strip is developed.

7. Apparatus for optically producing a predetermined FM function generator grating strip comprising, a light source, lens means in front of said light source for forming a collimated light beam having a central axis, an opaque shield intercepting said beam having an elongated narrow light opening therein extending across the said central axis for passing a predetermined restricted wide-thin collimated light beam therethrough, a transparent elongated sine-wave grating strip disposed for free longitudinal movement by the pull of gravity across said wide-thin collimated light beam perpendicular to said central axis and to the width of said wide thin light beam under the influence of gravity, releasable latch means for supporting said sine-wave grating against movement thereof by gravity, lens means fixed between said shield and said grating for focusing the image of said elongated narrow light opening on said elongated sine-wave grating, film strip supporting and moving means fixed in forwardly spaced relation to said elongated sine-wave grating for supporting and moving a sensitized photographic film strip in a plane through said light beam central axis perpendicular thereto, and in the same direction of, and parallel to, the plane of movement of said elongated sine-wave grating at a uniform rate of travel during release and free uniform gravitational accelerating movement of said elongated sine-wave grating, and lens means fixed between said elongated sine-wave grating and the plane of movement of said film strip, for focusing the image of the grid of said sine-wave grating on the sensitized surface of a sensitized film strip while supported and moved by said supporting and moving means during release and the accelerated gravitational movement of said grating, whereby the processing of the exposed sensitized film strip produces an FM function generator grating strip optically and photographically.

8. Apparatus for optically producing a predetermined FM function generator strip comprising, a light source, lens means fixed in front of said light source for forming a collimated light beam having a central axis, an opaque light shield intercepting said light beam having an elongated narrow light slit opening therein passing across said central axis, for passing a predetermined wide-thin collimated light beam therethrough, a transparent elongated sine-wave grating strip disposed for free longitudinal movement in one direction only by the pull of gravity, through said wide-thin light beam perpendicular to said central axis and perpendicular to the longitudinal direction of said wide-thin light slit, releasable latch means for supporting said sine-wave grating against movement thereof by gravity, lens means fixed between said light shield and said grating for focusing said restricted light opening slit on said sine-wave grating, film supporting and moving means disposed in forwardly spaced relation to said elongated sine-wave grating for supporting and moving a sensitized photographic film strip in a plane through said wide-thin light beam, perpendicular to the central axis thereof and parallel to the plane of movement of said elongated sine-wave grating at a uniform rate of travel in the same direction during release and free accelerating movement of said elongated sine-wave grating in said one direction under said influence of gravity, and lens means fixed between said elongated sine-wave grating and the plane of movement of the photographic film strip for focusing the image of said grid of said sine-wave grating on the sensitized surface of a sensitized photographic film strip while supported and moved by said supporting and moving means, during release and accelerating gravitational movement of said grating, whereby upon development and processing of said sensitized film strip a predetermined FM function generator grating strip is produced photographically and optically, in which said release means releasably retains said elongated sine-wave grating in position in said light beam against movement thereof under the influence of gravity until release, during the uniform movement of the sensitized film strip.

References Cited by the Examiner

UNITED STATES PATENTS

| | | | |
|---|---|---|---|
| 2,095,826 | 10/1937 | Miller | 95—75 |
| 2,540,105 | 2/1951 | Dunbar et al. | 179—100.3 X |
| 3,020,817 | 2/1962 | Burch. | |

JOHN M. HORAN, *Primary Examiner.*

MAYNARD R. WILBUR, C. L. JUSTUS, *Examiners.*